United States Patent
Loebig et al.

(10) Patent No.: US 8,946,635 B2
(45) Date of Patent: Feb. 3, 2015

(54) SYSTEM AND METHOD FOR MEASURING RADIANT ENERGY IN GAS TURBINE ENGINES, COMPONENTS AND RIGS

(75) Inventors: James Carl Loebig, Greenwood, IN (US); Jefre H. Cockerham, Martinsville, IN (US); Emil R. Dejulio, Columbus, IN (US); James E. McDonald, Monson, MA (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 497 days.

(21) Appl. No.: 12/981,317

(22) Filed: Dec. 29, 2010
(Under 37 CFR 1.47)

(65) Prior Publication Data
US 2011/0299065 A1 Dec. 8, 2011

Related U.S. Application Data

(60) Provisional application No. 61/291,545, filed on Dec. 31, 2009.

(51) Int. Cl.
*G01J 5/00* (2006.01)
*G01J 5/04* (2006.01)
*G01J 5/08* (2006.01)

(52) U.S. Cl.
CPC ............... *G01J 5/0088* (2013.01); *G01J 5/048* (2013.01); *G01J 5/0803* (2013.01); *G01J 5/0806* (2013.01); *G01J 5/0821* (2013.01)
USPC .................................................... 250/338.1

(58) Field of Classification Search
USPC .................................................... 250/338.1
See application file for complete search history.

(56) References Cited

U.S. PATENT DOCUMENTS

| | | | |
|---|---|---|---|
| 5,164,600 A | 11/1992 | Das et al. | |
| 5,226,731 A | 7/1993 | Allen | |
| 5,828,797 A | 10/1998 | Minott et al. | |
| 6,135,760 A | 10/2000 | Cusack et al. | |
| 6,354,733 B2 | 3/2002 | Glasheen et al. | |
| 6,370,486 B1 | 4/2002 | Sivathanu | |
| 6,422,745 B1 | 7/2002 | Glasheen et al. | |
| 6,640,199 B1 | 10/2003 | Goldstein et al. | |

(Continued)

FOREIGN PATENT DOCUMENTS

WO    WO 98/34086 A2    8/1998

OTHER PUBLICATIONS

International Search Report and Written Opinion, PCT/US2010/062528, Nov. 25, 2011, Rolls-Royce North American Technologies, Inc.

*Primary Examiner* — David Porta
*Assistant Examiner* — Kenneth J Malkowski
(74) *Attorney, Agent, or Firm* — Krieg DeVault LLP

(57) ABSTRACT

One embodiment of the present invention is a unique system for measuring radiant energy in gas turbine engines, gas turbine engine components and gas turbine engine/component rigs. Another embodiment is a unique method for measuring radiant energy in gas turbine engines, gas turbine engine components and gas turbine engine/component rigs. Other embodiments include apparatuses, systems, devices, hardware, methods, and combinations for measuring radiant energy. Further embodiments, forms, features, aspects, benefits, and advantages of the present application shall become apparent from the description and figures provided herewith.

18 Claims, 2 Drawing Sheets

(56) References Cited

U.S. PATENT DOCUMENTS

| | | |
|---|---|---|
| 6,741,875 B1 | 5/2004 | Pawluczyk et al. |
| 6,912,480 B2 | 6/2005 | Black |
| 6,983,603 B2 | 1/2006 | Macchia |
| 7,281,382 B2 | 10/2007 | Plimpton et al. |
| 7,469,077 B2 | 12/2008 | Xia et al. |
| 7,484,369 B2 | 2/2009 | Myhre |
| 7,497,073 B2 | 3/2009 | Black |
| 7,887,234 B2 * | 2/2011 | Jonnalagadda et al. ...... 374/124 |
| 2003/0185487 A1 | 10/2003 | Fernando et al. |
| 2003/0236642 A1 | 12/2003 | Timans |
| 2004/0179575 A1 | 9/2004 | Markham |
| 2005/0082480 A1 | 4/2005 | Wagner et al. |
| 2005/0180699 A1 | 8/2005 | Shu et al. |
| 2007/0107504 A1 | 5/2007 | Smed et al. |

* cited by examiner

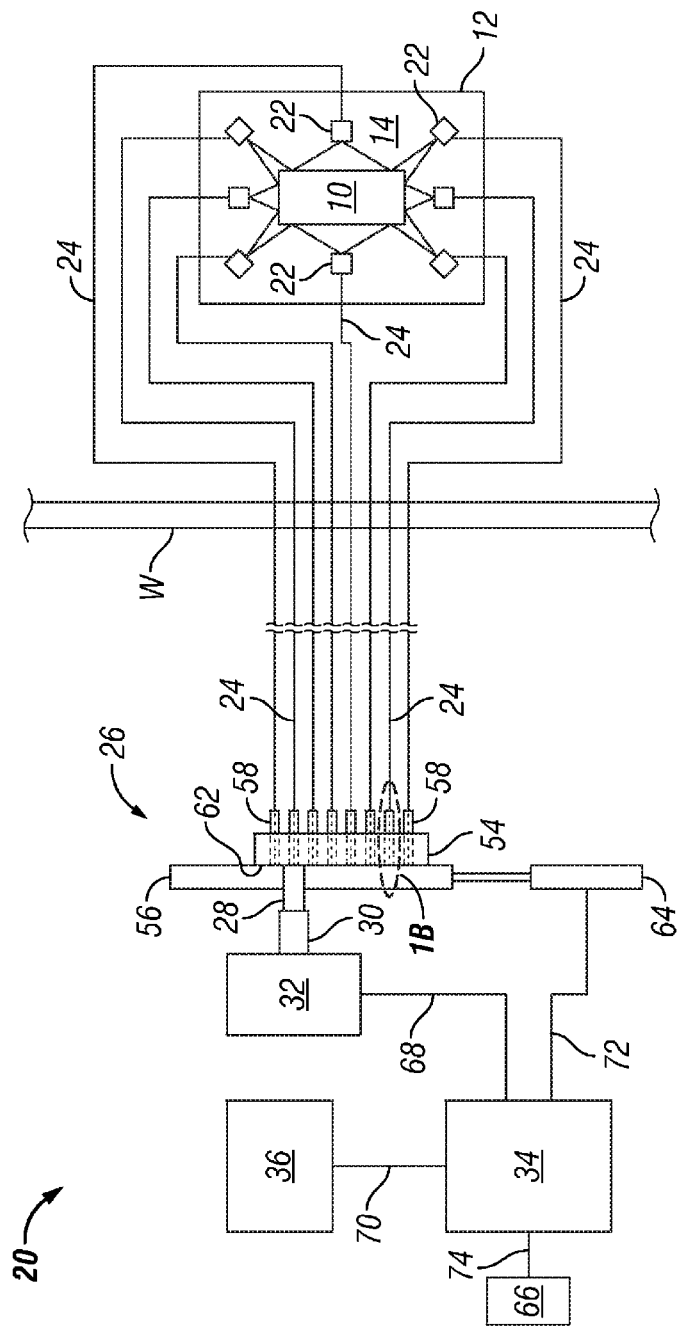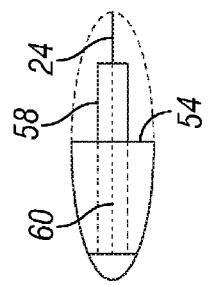
FIG. 1A
FIG. 1B

SYSTEM AND METHOD FOR MEASURING RADIANT ENERGY IN GAS TURBINE ENGINES, COMPONENTS AND RIGS

CROSS REFERENCE TO RELATED APPLICATIONS

The present application claims the benefit of U.S. Provisional Patent Application 61/291,545, filed Dec. 31, 2009, and is incorporated herein by reference.

FIELD OF THE INVENTION

The present invention relates to gas turbine engines, and more particularly, to systems and methods for measuring radiant energy in a gas turbine engine and gas turbine engine components and rigs.

BACKGROUND

The measurement of radiant energy in gas turbine engines, gas turbine engine components and rigs remains an area of interest. Some existing systems have various shortcomings, drawbacks, and disadvantages relative to certain applications. Accordingly, there remains a need for further contributions in this area of technology.

SUMMARY

One embodiment of the present invention is a unique system for measuring radiant energy in gas turbine engines, gas turbine engine components and gas turbine engine/component rigs. Another embodiment is a unique method for measuring radiant energy in gas turbine engine, gas turbine engine components and gas turbine engine/component rigs. Other embodiments include apparatuses, systems, devices, hardware, methods, and combinations for measuring radiant energy. Further embodiments, forms, features, aspects, benefits, and advantages of the present application shall become apparent from the description and figures provided herewith.

BRIEF DESCRIPTION OF THE DRAWINGS

The description herein makes reference to the accompanying drawings wherein like reference numerals refer to like parts throughout the several views, and wherein:

FIGS. 1A and 1B schematically illustrates a non-limiting example of a system for measuring radiant energy in gas turbine engines, components and test rigs in accordance with an embodiment of the present invention.

DETAILED DESCRIPTION

Figure 2A:
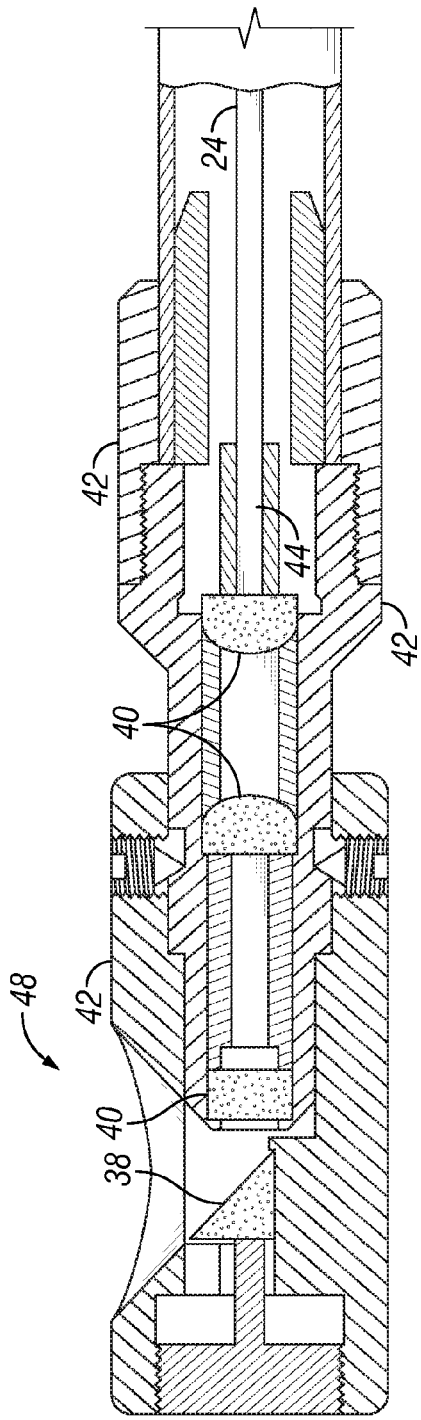
FIGS. 2A and 2B depict a non-limiting example of an optical collection element and a fiber-optic lead in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring now to the drawings, and in particular, FIGS. 1A and 1B, a non-limiting example of a high temperature structure 10 in accordance with an embodiment of the present invention is depicted. In one form, structure 10 is a component of gas turbine engine, such as a combustion liner, a turbine blade, vane or wheel, or another gas turbine engine component. In other embodiments, structure 10 may be a high temperature test rig component or gas turbine engine component installed in a test rig. In still other embodiments, high temperature structure 10 may be a gas turbine engine.

In one form structure 10 is contained within another structure 12, such as a test rig, a furnace, a gas turbine engine case structure or another gas turbine engine structure. In one form, structure 12 is pressurized. In other embodiments, structure 12 may not be pressurized. Structure 10 and structure 12 may take other forms in other embodiments, and may be components other than gas turbine engines and/or gas turbine engine components and/or gas turbine engine test rigs or components, unless specifically claimed herein. In one form, structure 10 is disposed in a fluid 14, such as air or combustion products. In one form, fluid 14 is in motion, e.g., representative of the output of a gas turbine engine compressor, combustor and/or turbine.

The temperatures inside structure 12 are elevated, e.g., 600° F. or greater. In one form, the temperatures inside structure 12 are approximately 900° F. or greater. In a particular form, the temperatures inside structure 12 are approximately 1100° F. or greater. Structure 10 experiences high temperatures at various operating points. In one form, structure 10 has skin temperatures above 1500° F. In a particular form, structure 10 has skin temperatures in the range of 1800° F. to 2100° F. In other embodiments, structure 10 may have skin temperatures at higher and/or lower temperatures, e.g., including up to 3500° F. In one form, fluid 14 is at an elevated temperature, e.g., 600° F. or greater. In a particular form, fluid 14 is at a temperature of approximately 900° F. or greater. In a more particular form, the temperature of fluid 14 is approximately 1100° F. or greater. In other embodiments, the temperature of fluid 14 may be greater still, such as 1800° F. to 2100° F. or greater.

In various situations, e.g., during the testing or operation of a gas turbine engine or gas turbine engine components, it is desirable be able to determine surface temperatures and gas temperatures. In order to confirm the temperature at desired locations, i.e., areas of interest on structure 10 and/or areas of interest in fluid 14 locations, a system 20 for measuring radiant energy in accordance with an embodiment of the present invention may be employed.

System 20 includes a plurality of optical collection elements 22, a plurality of fiber-optic leads 24, a fiber channel selection switch 26, a proximal lens 28, an optical filter 30, a detector 32, a controller 34 and a display 36. In the depicted example, a wall W separates structures 10 and 12 from fiber channel selection switch 26, proximal lens 28, optical filter 30, detector 32, controller 34 and display 36. Optical collection elements 22 are disposed in structure 12 on the other side of wall W, and fiber-optic leads 24 are partially disposed on both sides of wall W, extending between optical collection elements 22 and fiber channel selection switch 26.

Figure 2B:
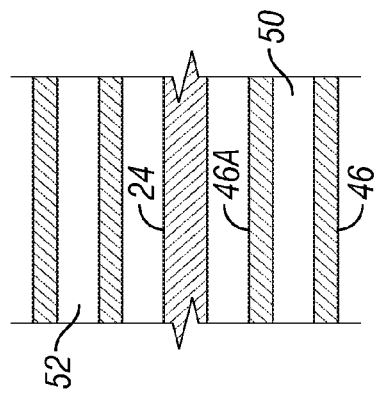

Referring now to FIGS. 2A and 2B, a non-limiting example of an optical collection element 22 in accordance with an embodiment of the present invention is depicted. Optical collection element 22 is operative to view an area of interest, e.g., on or in the vicinity of structure 10. Optical collection element 22 includes a distal lens 38, optical transmission elements 40 and a multi-part casing 42 for housing distal lens 38 and transmission elements 40. Transmission elements 40 are in optical communication with distal lens 38 and fiber-optic lead 24. As used herein, "optical communication" means that the components that are in optical communication are arranged and configured to transmit therebetween optical signals, i.e., electromagnetic (EM) waves, in the desired EM band. In one form, the desired EM band is infrared (IR) and near infrared (NIR) radiation. In other embodiments, other EM bands may be employed in addition to or in place of IR and NIR wavelengths.

Distal lens 38 is structured to view the area of interest and to collect raw optical image data therefrom, e.g., IR and NIR energy in the form of electromagnetic waves emanating from structure 10 and/or fluid 14. In one form, distal lens 38 is a reflecting prism. In other embodiments, distal lens 38 may take other forms, for example, a transmitting prism or one or more other types of lenses. In one form, distal lens 38 is coated with a high temperature reflective coating. The coating is configured for operation at the temperatures inside structure 12 to which it is exposed. In one form, the coating is configured for operation at temperatures of at least 1100° F. In other embodiments, the coating may be configured for operation at higher temperatures.

Transmission elements 40 are configured to transmit the optical data received from distal lens 38 for reception by the distal end 44 of fiber-optic lead 24. Fiber-optic lead 24 is disposed inside a shielding 46. In one form, shielding 46 is a stainless steel tube. In other embodiments, shielding 46 may take other forms. Casing 42 is configured to receive and retain fiber-optic lead 24 and shielding 46, and to align fiber-optic lead 24 with the optical path of transmission elements 40. In one form, casing 42 is structured to focus the optical data received from distal lens 38, e.g., by varying the distance between distal lens 38 and transmission elements 40. In other embodiments, casing 42 may not be structured to perform a focusing function. Casing 42 includes an opening 48 for optically exposing distal lens 38 to the area of interest.

In one form, optical collection element 22 and fiber-optic lead 24 are uncooled. By being uncooled, smaller diameters of optical collection elements 22 and shielding 46 may be employed, and potential adverse impacts resulting from the introduction of cooling jacket gases into structure 12 are avoided. In other embodiments, optical collection element 22 and/or fiber-optic lead 24 may be cooled. For example, cooling air may be provided via one or more passages inside shielding 46, which may be discharged into, for example, structure 12. In the depiction of FIG. 2A, an alternative embodiment of shielding 46 includes an inner annular wall 46A and two annular passages 50 and 52 which may be used as supply and return passages for a cooling medium, such as air, without discharging the cooling medium inside structure 12.

Fiber-optic lead 24 is operative to transmit the optical data received from transmission elements 40 for reception by proximal lens 28. Fiber-optic lead 24 is configured for operation at elevated temperatures. In one form, fiber-optic lead 24 is configured for operation at temperatures up to 1100° F. In other embodiments, fiber-optic lead 24 may be configured for operation at temperatures up to 1800° F. to 2100° F. or greater. In one form, fiber-optic lead 24 is a fused silica coherent optical-fiber bundle. One commercially available fused silica coherent optical-fiber bundle that is suitable for use as fiber-optic lead 24 is available from Fujikura America, Inc.

Referring again to FIGS. 1A and 1B, fiber channel selection switch 26 includes a terminal plate 54 and an output plate 56. Terminal plate 54 includes a plurality of terminals 58. Terminals 58 are operative to receive and mechanically couple the proximal end 60 of fiber-optic leads 24 to fiber channel selection switch 26. Output plate 56 includes an image output port 62. In one form, image output port is operative to transmit the optical data from fiber-optic lead 24 to proximal lens 28. In one form, image output port 62 is operative to transmit optical data from a single fiber-optic lead 24. In other embodiments, image output port 62 is operative to transmit optical data from a plurality of fiber-optic leads. In one form, output plate 56 is structured to mount proximal lens 28 in image output port 62. In other embodiments, other arrangements for mounting proximal lens 28 may be employed. In various embodiments, image output port 62 may take different forms, and may be, for example, an optical pathway, or may simply be an opening in output plate 56 that permits proximal lens 28 to be in close proximity to the desired fiber-optic lead 24.

Fiber channel selection switch 26 is structured to selectively expose output port 62 to a chosen fiber-optic lead 24 in response to a control input. In various embodiments, fiber channel selection switch 26 is structured to move at least one of terminal plate 54 and output plate 56 relative to the other, to align the chosen fiber-optic lead 24 with proximal lens 28. In some embodiments, optical oil may be employed between the interface of terminal plate 54 and output plate 56 and/or proximal lens 28 in order to aid in the transmission of the optical data from fiber-optic leads 24 to proximal lens 28.

In one form, a mechanical actuator 64 is coupled to output plate 56, and is operative to move output plate 56 relative to terminal plate 54 to align proximal lens 28 with the output of a chosen fiber optic lead 24 via output port 62. In one form, the movement is via remote control of actuator 64 in response to commands from controller 34, e.g., via human input to a keyboard 66 coupled to controller 34. In other embodiments, the movement may be by hand. In still other embodiments, fiber channel selection switch 26 may be operative to move output plate 56 relative to terminal plate 54 in order to align the output of a fiber-optic lead 24 with proximal lens 28, or to move terminal plate 54 in addition to or in place of moving output plate 56 to effect the alignment. In one form, the movement is translational. In various embodiments, the movement may be translational and/or rotational, e.g., depending on the geometries of terminal plate 54 and output plate 56. It will be understood that the term "plate" in "terminal plate 54" and "output plate 56" is descriptive only, and that the physical geometry of those components may be any suitable geometry that allows the transmission of optical data from a selected one or more fiber-optic lead 24 to proximal lens 28.

Optical filter 30 is operative to filter the raw optical image data prior to it reaching detector 32. In one form, optical filter 30 is a band-pass filter. In other embodiments, other filter types may be employed, e.g., high pass filters, low pass filters, or multiple band-pass filters. In a particular form, optical filter 30 is operative to restrict the raw optical image data to a range of approximately 0.9 to approximately 1.05 micron wavelength, which restricts system 20 to collecting NIR data to the range of 0.9 to 1.05 microns. In other embodiments, optical filter 30 may be configured to pass other wavelengths in addition to or in place of 0.9 to 1.05 microns, e.g., depending upon the temperatures exhibited by structure 10 and fluid 14.

In the depicted embodiment, optical filter 30 is positioned between proximal lens 28 and detector 32. In other embodiments, optical filter 30 may be positioned in other locations. Alternate locations for optical filter 30 include, but are not limited to, being positioned inside or on one more optical collection elements 22, at the proximal end 60 or distal end 44 of one or more fiber-optic leads 24, or between proximal lens 28 and terminal plate 54 of fiber channel selection switch 26.

Proximal lens 28 is operative to focus the raw optical data onto detector 32. In one form, system 20 employs a single proximal lens 28. In other embodiments, more than one proximal lens may be employed. Detector 32 is an optical head. In one form, detector 32 is operative to convert the raw optical data into electrical signals. In one form, detector 32 is a digital device. In other embodiments, detector 32 may be an analog device. In a particular form, detector 32 is digital camera. In other embodiments, an analog camera may be employed. In a more particular form, detector 32 is an indium-gallium-arsenide detector. One commercially available device that is suitable for use as detector 32 is the Alpha NIR™ camera available from FLIR Systems, Inc.

Controller 34 is communicatively coupled to detector 32, display 36, actuator 64 and keyboard 66 via communications links 68, 70, 72 and 74. In one form, communications links 68, 70, 72 and 74 are wired connections. In other embodiments, wireless connections or combinations of wired and wireless connections may be employed. Although display 36 is coupled to controller 34 in the present embodiment, in other embodiments, display 36 may be coupled directly to detector 32.

Controller 34 is configured to execute program instructions to, among other things, receive the output of detector 32, display the output on display 36, and store the output in a suitable memory device. Controller 34 is also operative to control actuator 64 to align proximal lens 28 with the selected fiber-optic lead 24. The alignment may be performed automatically by controller 34 and/or manually by operator input via keyboard 66.

In one form, controller 34 is microprocessor based and the program instructions are in the form of software stored in a memory (not shown). In a particular form, controller 34 is a computer having a data acquisition card in communication with detector 32. However, it is alternatively contemplated that the controller and program instructions may be in the form of any combination of software, firmware and hardware, including state machines, and may reflect the output of discreet devices and/or integrated circuits, which may be co-located at a particular location or distributed across more than one location, including any digital and/or analog devices configured to achieve the same or similar results as a processor-based controller executing software or firmware based instructions.

During operation, system 20 is operative to selectively view different areas of interest inside structure 12, e.g., areas of interest in or on structure 10 and fluid 14 by aligning the output of a fiber-optic lead 24 associated with the desired area of interest with proximal lens 28. This alignment completes the optical path from the area of interest to detector 32 via the optical collection element 22, fiber-optic lead 24, proximal lens 28 and optical filter 30. The data output by detector 32 in response to detecting the optical data from optical collection elements 22 may be displayed in display 36, and may also be analyzed to determine temperature data associated with structure 10 and fluid 14.

Embodiments of the present invention include a system for measuring radiant energy from a high temperature structure, comprising: a plurality of optical collection elements, wherein each optical collection element is operative to view an area of interest; a plurality of fiber-optic leads in optical communication with the plurality of optical collection elements; a fiber channel selection switch having an image output port and being structured to receive the plurality of fiber-optic leads; a proximal lens in optical communication with the image output port; and a detector in optical communication with the proximal lens and operative to capture optical data from the proximal lens, wherein the fiber channel selection switch is structured to selectively expose the output port to a chosen fiber-optic lead in response to a control input.

In a refinement, control input is based on a human selection of a fiber-optic lead of the plurality of fiber-optic leads.

In another refinement, the fiber channel selection switch is remotely controlled.

In yet another refinement, each optical collection element includes a distal lens structured to view the area of interest.

In still another refinement, the distal lens is a reflecting prism.

In yet still another refinement, the reflecting prism includes a high temperature reflective coating configured for operation at temperatures of at least 1100° F.

In a further refinement, the fiber channel selection switch includes a terminal plate having individual terminals for mechanically coupling each fiber optic lead to the fiber channel selection switch; and wherein the fiber channel selection switch is structured to move at least one of the terminal plate and the output port relative to the other of the terminal plate and the output port to align the chosen fiber-optic lead with the output port.

In a yet further refinement, a fiber-optic lead of the plurality of fiber-optic leads is a fused silica optical-fiber bundle.

In a yet still further refinement, the system includes an optical filter positioned to filter the optical data prior to capture of the optical data by the detector.

In an additional refinement, the optical filter is a band-pass filter operative to pass near-infrared radiation having wavelengths in the range of 0.9 to 1.05 microns.

Embodiments of the present invention include a system for measuring radiant energy in a gas turbine engine component, comprising: a plurality of optical collection elements, wherein each optical collection element is positioned inside one of a gas turbine engine and a gas turbine engine test rig, and wherein each optical collection element is operative to view an area of interest on the gas turbine engine component; a plurality of fiber-optic leads in optical communication with the plurality of optical collection elements and extending to outside of the one of the gas turbine engine and the gas turbine engine test rig; and means for selectively capturing optical data from a chosen fiber-optic lead, wherein the means for selectively capturing the optical data are positioned outside of the one of the gas turbine engine and the gas turbine engine test rig.

In a refinement, the means for selectively capturing optical data includes a proximal lens selectively exposed to the chosen fiber-optic lead to complete an optical path between the chosen fiber-optic lead and the proximal lens.

In another refinement, the means for selectively capturing optical data includes a near-infrared (NIR) detector.

In yet another refinement, the NIR detector is a camera.

In still another refinement, the NIR detector is a digital device.

In yet still another refinement, the NIR detector is an indium-gallium-arsenide detector.

In a further refinement, at least one of the fiber-optic leads and at least one of the optical collection elements are uncooled and are configured for operation in temperatures of at least 1100° F.

In a yet further refinement, at least one of the fiber-optic leads and at least one of the optical collection elements are uncooled and are configured for operation in temperatures of up to 2100° F.

Embodiments of the present invention include a method for measuring radiant energy, comprising: coupling first ends of a plurality of fiber-optic leads with a plurality of optical collection elements; positioning the optical collection elements in a high temperature apparatus, wherein each optical collection element is operative to view an area of interest; coupling second ends of the plurality of fiber-optic leads to a fiber channel selection switch having a plurality of terminals configured to receive the second ends; positioning a proximal lens in optical communication with an output port of the fiber channel selection switch; choosing a fiber-optic lead for viewing; exposing the output port to the chosen fiber-optic lead; and capturing optical data from the chosen fiber-optic lead via the proximal lens.

In a refinement, the exposing of the output port to the chosen fiber-optic lead includes moving at least one of the proximal lens and a terminal of the plurality of terminals associated with the chosen fiber-optic lead relative to the other to optically align the chosen fiber-optic lead with the proximal lens.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A system for measuring radiant energy from a high temperature structure, comprising:
   a plurality of optical collection elements, wherein each optical collection element is operative to view an area of interest on a surface of a gas turbine engine component; and wherein each optical collection element is configured to receive and focus optical data from the surface of the gas turbine engine component;
   a plurality of fiber-optic leads in optical communication with the plurality of optical collection elements;
   a fiber channel selection switch having an image output port and being structured to receive the plurality of fiber-optic leads;
   a proximal lens in optical communication with the image output port; and
   a detector in optical communication with the proximal lens and operative to capture optical data from the proximal lens, wherein the detector is configured to determine the temperature of the surface of the gas turbine engine component in the area of interest, based on the optical data,
   wherein the fiber channel selection switch is structured to selectively expose the image output port to a chosen fiber-optic lead in response to a control input; and
   wherein the fiber channel selection switch includes a terminal plate having individual terminals for mechanically coupling each fiber optic lead to the fiber channel selection switch; and wherein the fiber channel selection switch is structured to translatingly move at least one of the terminal plate and the image output port relative to the other of the terminal plate and the image output port to align the chosen fiber-optic lead with the image output port.

2. The system of claim 1, wherein the control input is based on a human selection of a fiber-optic lead of the plurality of fiber-optic leads.

3. The system of claim 1, wherein the fiber channel selection switch is remotely controlled.

4. The system of claim 1, wherein each optical collection element includes a distal lens structured to view the area of interest.

5. The system of claim 4, wherein the distal lens is a reflecting prism.

6. The system of claim 5, wherein the reflecting prism includes a high temperature reflective coating configured for operation at temperatures of at least 1100° F.

7. The system of claim 1, wherein a fiber-optic lead of the plurality of fiber-optic leads is a fused silica optical-fiber bundle.

8. The system of claim 1, further comprising an optical filter positioned to filter the optical data prior to capture of the optical data by the detector.

9. The system of claim 8, wherein the optical filter is a band-pass filter operative to pass near-infrared radiation having wavelengths in a range of 0.9 to 1.05 microns.

10. A system for measuring radiant energy in a gas turbine engine component, comprising:
    a plurality of optical collection elements, wherein each optical collection element is positioned inside one of a gas turbine engine and a gas turbine engine test rig, wherein each optical collection element is operative to view an area of interest on a surface of the gas turbine engine component; and wherein each optical collection element is configured to receive and focus optical data from the surface of the gas turbine engine component;
    a plurality of fiber-optic leads in optical communication with the plurality of optical collection elements and extending to outside of the one of the gas turbine engine and the gas turbine engine test rig; and
    means for selectively capturing optical data from a chosen fiber-optic lead, wherein the means for selectively capturing the optical data are positioned outside of the one of the gas turbine engine and the gas turbine engine test rig; wherein the means for selectively capturing optical data includes a translating switch means; and wherein the means for selectively capturing optical data includes means for determining the temperature of the surface of the gas turbine engine component in the area of interest, based on the optical data.

11. The system of claim 10, wherein the means for selectively capturing optical data includes a proximal lens selectively exposed to the chosen fiber-optic lead to complete an optical path between the chosen fiber-optic lead and the proximal lens.

12. The system of claim 10, wherein the means for selectively capturing optical data includes a near-infrared (NIR) detector.

13. The system of claim 12, wherein the NIR detector is a camera.

14. The system of claim 12, wherein the NIR detector is a digital device.

15. The system of claim 12, wherein the NIR detector is an indium-gallium-arsenide detector.

16. The system of claim 10, wherein at least one of the fiber-optic leads and at least one of the optical collection elements are uncooled and are configured for operation in temperatures of at least 1100° F.

17. The system of claim 10, wherein at least one of the fiber-optic leads and at least one of the optical collection elements are uncooled and are configured for operation in temperatures of up to 2100° F.

18. A method for measuring radiant energy, comprising:
coupling first ends of a plurality of fiber-optic leads with a plurality of optical collection elements;
positioning the optical collection elements in a high temperature apparatus, wherein each optical collection element is operative to view an area of interest on a surface of a component;
coupling second ends of the plurality of fiber-optic leads to a fiber channel selection switch having a plurality of terminals configured to receive the second ends;
positioning a proximal lens in optical communication with an output port of the fiber channel selection switch;
receiving optical data from the surface of the component using the optical collection elements;
focusing the optical data using the optical collection elements;
choosing a fiber-optic lead for viewing;
exposing the output port to the chosen fiber-optic lead;
capturing the optical data from the chosen fiber-optic lead via the proximal lens; and
determining the temperature of the surface of the component based on the optical data;
wherein the exposing of the output port to the chosen fiber-optic lead includes axially displacing at least one of the proximal lens and a terminal of the plurality of terminals associated with the chosen fiber-optic lead relative to the other to optically align the chosen fiber-optic lead with the proximal lens.

* * * * *